United States Patent

[11] 3,623,573

| [72] | Inventors | Michael Csanady, Jr.<br>Ridley Park;<br>Frederick W. Kramer, Wallingford, both of Pa. |
|---|---|---|
| [21] | Appl. No. | 12,706 |
| [22] | Filed | Feb. 19, 1970 |
| [45] | Patented | Nov. 30, 1971 |
| [73] | Assignee | Westinghouse Electric Corporation<br>Pittsburgh, Pa. |

[54] LUBRICATION SYSTEM
6 Claims, 6 Drawing Figs.

[52] U.S. Cl. .................................................. 184/6 R,
165/72
[51] Int. Cl. ...................................................... F01m 5/00
[50] Field of Search .......................................... 184/6 R, 6
Y, 27 A, 6 T, 6 S, 6 L, 27 R; 60/52 US, 95 A;
165/72, 76

[56] References Cited
UNITED STATES PATENTS

| 1,490,942 | 4/1924 | Schmidt | 184/6 |
| 1,616,829 | 2/1927 | Saybolt | 184/6 |
| 2,300,284 | 10/1942 | Gayer | 184/6 |
| 2,308,815 | 1/1943 | Kocher | 184/27 X |
| 2,440,980 | 5/1948 | Sheppard | 184/6 TS |
| 3,272,285 | 9/1966 | Thomas | 184/6 Y |

*Primary Examiner*—Manuel A. Antonakas
*Attorneys*—A. T. Stratton, F. P. Lyle and F. Cristiano, Jr.

ABSTRACT: A lubrication system for a machine, having bearings rotatably supporting one or more journals, such as in a turbine or generator. The system comprises a lubricant reservoir having an open top portion and closed side and bottom portions. The reservoir may be a cylindrical reservoir or an underground reinforced concrete reservoir which would be lined with a material impervious to the oil. The lubricant conduits are cut and fitted outside of an independent of the reservoir. The conduits and pumping equipment are then mounted on inner and outer surfaces of a plate to form a unitary plate structure. The plate structure is lowered onto a shelf portion surrounding the open portion of the reservoir. The conduits inside of the reservoir are secured by adjustable supports to the reservoir. The plate structure is detachably secured to the reservoir thereby enclosing the reservoir.

LUBRICATION SYSTEM

BACKGROUND OF THE INVENTION

This invention relates to a lubrication system for supplying oil to a large machine having bearings rotatably supporting one or more journals, such as in a turbine or generator.

Such machines require large oil reservoirs, and an acute problem is that a large number of conduits and pumping equipment must be secured to the outside and inside of the reservoir. Previously, the reservoir was needed at the manufacturing shop site to fit the conduits and pumping equipment. Long and heavy conduits of 8 inches in diameter and which may be larger were lowered into the reservoir, where one or more men inside of the reservoir would fit the conduits to the reservoir. The cutting and welding of the conduits was either done inside the reservoir or the conduits were lifted out by a crane, cut and welded, and then lowered back into the reservoir. Then the conduits were fastened to the reservoir. The pumping equipment was fastened to the outside of the reservoir and the conduits were connected to the pumping equipment.

The welding and cutting done inside of the reservoir created a very unhealthy working environment. Additionally, the working space was limited and confining, resulting in a time consuming and expensive procedure. If the piping was lifted out and then back into the reservoir, the procedure was still more expensive and time consuming. Furthermore, since the reservoir was required to be at the shop site for fitting, valuable shop space was utilized, thereby creating much congestion. As an example, a reservoir for a large turbogenerator unit is on the order of 8 feet in diameter, 20 feet long and weighs over 40,000 pounds.

A second major problem with the large lubricant reservoirs is the expense involved in providing a proper foundation to support the reservoir, the related equipment, and the lubricant. For example, the reservoir, the piping, the pumping equipment and the lubricant for a 15,000 gallon reservoir may weigh in excess of 200,000 pounds. Additionally, there is a surface land requirement for storing the reservoir in addition to the land requirement for the turbogenerator unit at the installation site.

It would be desirable then to design a lubrication system that can be fabricated outside of and independent of the reservoir, but which would require only a minimum of connections to the outside and inside of the reservoir. It would further be desirable to design a reservoir which would not require additional surface space besides that required for the turbogenerator and would not require an additional supporting foundation.

SUMMARY

This invention relates to a lubrication system for supplying lubricant to a large machine having bearings rotatably supporting one or more journals, such as in turbines and generators.

A lubricant reservoir is provided with an open top portion and closed side and bottom portions. On the top of the reservoir, surrounding the open portion, is a shelf portion to receive a unitary plate structure. Also provided on the reservoir are suitable inlet and outlet openings, and internal fastening means to secure the conduits to the reservoir structure.

The unitary plate structure comprises a plate having an outer and inner surface and various size openings in the plate to receive conduits and pumping equipment. The conduits and pumping equipment are secured to the outer and inner surfaces of the plate. All fitting, cutting, welding, and the fastening of the conduits and pumping equipment to the plate, can be done independently of and apart from the reservoir. The unitary plate structure can then be lifted onto the shelf portion, with the conduits and pumping equipment connected on the inner surface of the plate extending into the reservoir. Internal connections may then be made to a cooler. Then internal fastening means may secure the conduits and pumping equipment to the reservoir. The unitary plate structure is detachably secured to the shelf thereby closing the reservoir. External connections are made to the inlet and outlet openings on the reservoir and to the conduits on the outer plate surface.

In the primary embodiment, the reservoir is cylindrical. When the open top portion of the reservoir is too small to admit all of the internal conduits and pumping equipment, a first portion of the conduit remains secured to the inner plate surface and a second portion is disconnected. The second portion is first inserted into the reservoir, secured to the reservoir, and then the remainder of the unitary plate structure is inserted. The first and second portions are then connected together.

In the second embodiment, the reservoir is in the form of an underground reservoir using a portion of the reinforced concrete foundation from the turbogenerator unit to form the frame of the reservoir. The inside portion of the reservoir is lined with a thin material impervious to the oil, that liner being dependent on the concrete for its shape and support.

By utilizing the unitary plate structure, it is unnecessary for the reservoir to be at the shop site for extended periods of time. The conduits and pumping equipment can be fitted, aligned, cut, and welded outside of the reservoir. This eliminates the need for the repeated raising and lowering of these heavy conduits and pumps and of the welding etc. previously done by a man inside of the reservoir. Now the only work necessary to be done inside of the reservoir is the possible bolting together of the conduits and minor adjustments for the securing of the internal conduits to the reservoir. This results in a substantial time savings in erecting the lubrication system and a corresponding monetary savings. Furthermore, the human working environment is substantially improved so that a man inside of the reservoir does no welding and the time spent inside is minimized.

By designing an oil reservoir to be part of the actual turbogenerator foundation, as in the second embodiment, this results in a savings of surface land, which may be unavailable. Furthermore, this type of reservoir does not require an additional foundation which is necessary to support the standard reservoir and the reservoir can be cast at the same time the foundation is poured, resulting in additional financial savings.

DESCRIPTION OF THE PREFERRED EMBODIMENT

Figure 1:
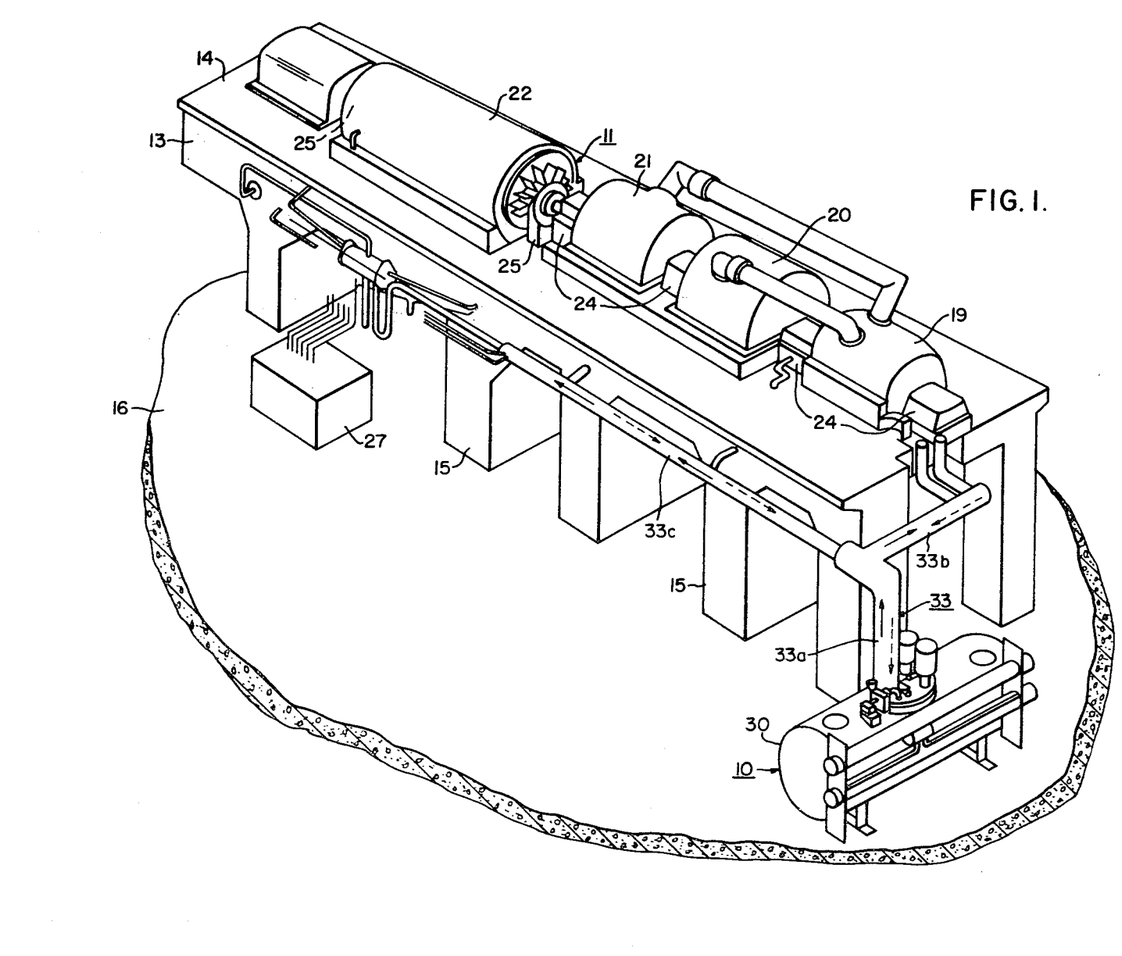
FIG. 1 is a view in perspective of a turbogenerator unit having a lubrication system and reservoir formed in accordance with the present invention.

Referring to the drawings in detail and particularly to FIG. 1, there is shown a lubrication system 10 for a turbogenerator unit 11 which is a typical environment for the lubrication system. The turbogenerator unit 11 is mounted on a reinforced concrete foundation 13 having an upper floor level 14, supported by a plurality of horizontally spaced and vertically extending bulk heads 15, and a lower floor level 16. The turbogenerator unit 11, as shown, is comprised of a high pressure steam turbine unit 19 and two low pressure steam turbine units 20 and 21. The turbine units 19, 20 and 21 are in driving connection with an electric generator 22 which produces electricity for consumption. The lubrication system 10 supplies oil to the steam turbine units and the generator 22 at bearings 24 and 25, respectively. The lubrication system 10 may also supply oil to the other accessories such as the hydraulic controls (not shown) and the hydrogen seal oil unit 27, which provides a seal for the hydrogen in the generator 22, as is well known in the art. It should be understood that the turbogenerator unit 11, the accessories, and the foundation 13 per se comprise no part of this invention.

Lubricant is pumped from a lubricant reservoir 30 located on the lower floor level 16, through suitable conduits located within a gravity drain and guard pipe 33, hereinafter called the guard pipe to the bearings 24 and 25 and to the hydrogen seal oil unit 27 as indicated by the solid arrows. The lubricant, from the turbogenerator 11, empties into the guard pipe 33 comprised of a vertical section 33a and two horizontal sections 33b and 33c, all at right angles to each other, and returns to the reservoir 30 as indicated by the dashed arrows. The guard pipe 33 acts as a safety enclosure surrounding high pressure lubricant conduits within the guard pipe and which will be further described.

Figure 2:
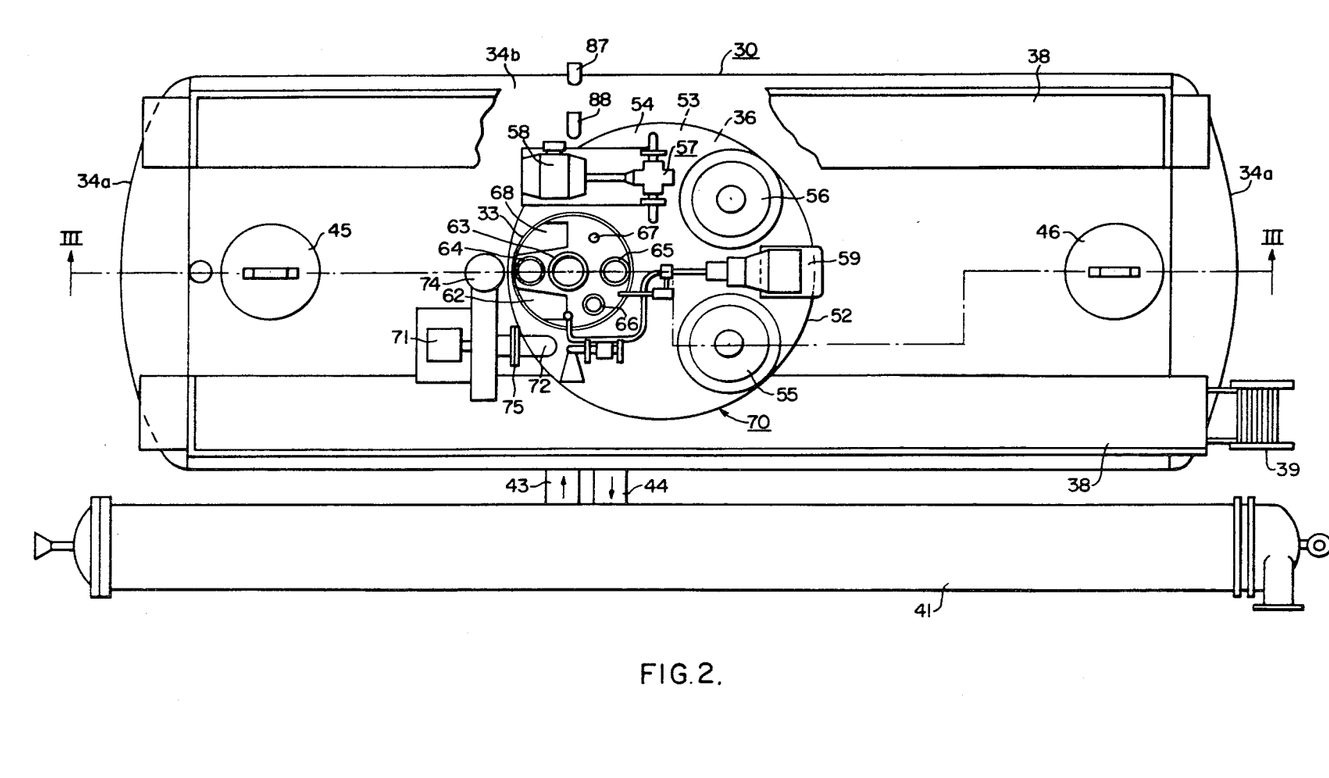
FIG. 2 is an enlarged plan view of the lubrication reservoir shown in FIG. 1.
Figure 5:
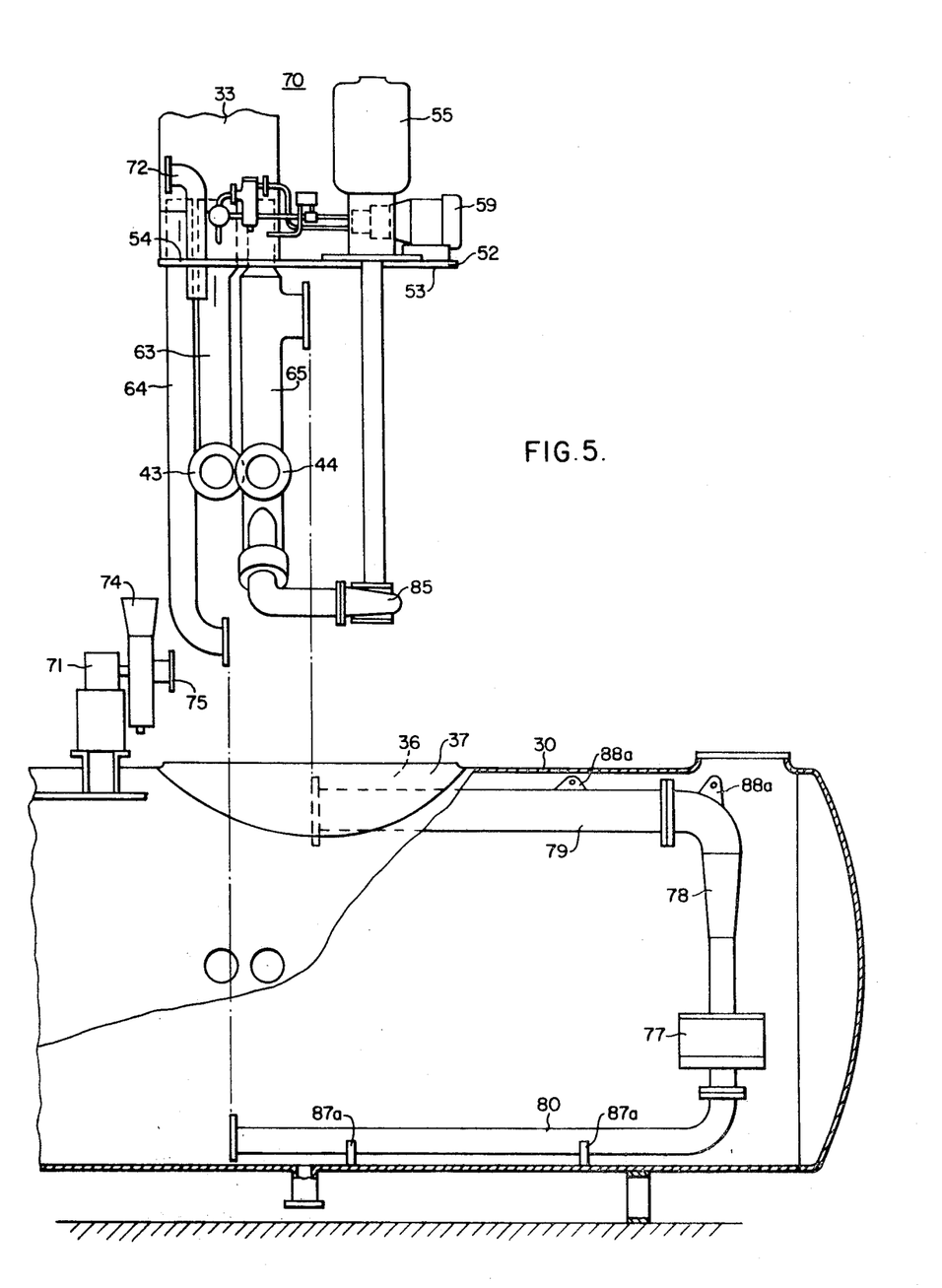
FIG. 5 is a view similar to FIG. 3, but showing a portion of the reservoir in elevation and a portion exploded.

Referring to FIG. 2, it can be seen that the reservoir 30 has two end portions 34a which may be hemispherical in shape, and a cylindrical body portion 34b, with the end portions being secured to the cylinder portion by any suitable means. On the top of the reservoir 30 is an opening 36, which may be circular in plan (FIGS. 2 and 5). An annular saddle shaped shelf 37 (FIG. 5) is welded to the reservoir 30 surrounding the opening 36. The walkways 38 may be secured to the top of the reservoir 30 (FIG. 2) by any suitable fastening means and a ladder 39 may be employed to gain access from the ground to the walkways 38. Also mounted on the top of the reservoir 30 near one end is an oil strainer 50 (FIG. 3), which is accessible through an opening into the reservoir.

Two coolers 41 (FIGS. 2 and 4) may be employed to cool the lubricant, one cooler acting as a backup for the other. The coolers 41 and the reservoir 30 are arranged in a side-by-side relation. The reservoir 30 is connected to the coolers 41 by external conduits 43 and 44, extending horizontally between the reservoir and the coolers. Oil is circulated from the reservoir 30 to the coolers 41 through conduit 44. The coolers 41, in heat transfer relation, cool and return the oil through conduit 43 to the reservoir 30.

Figure 3:
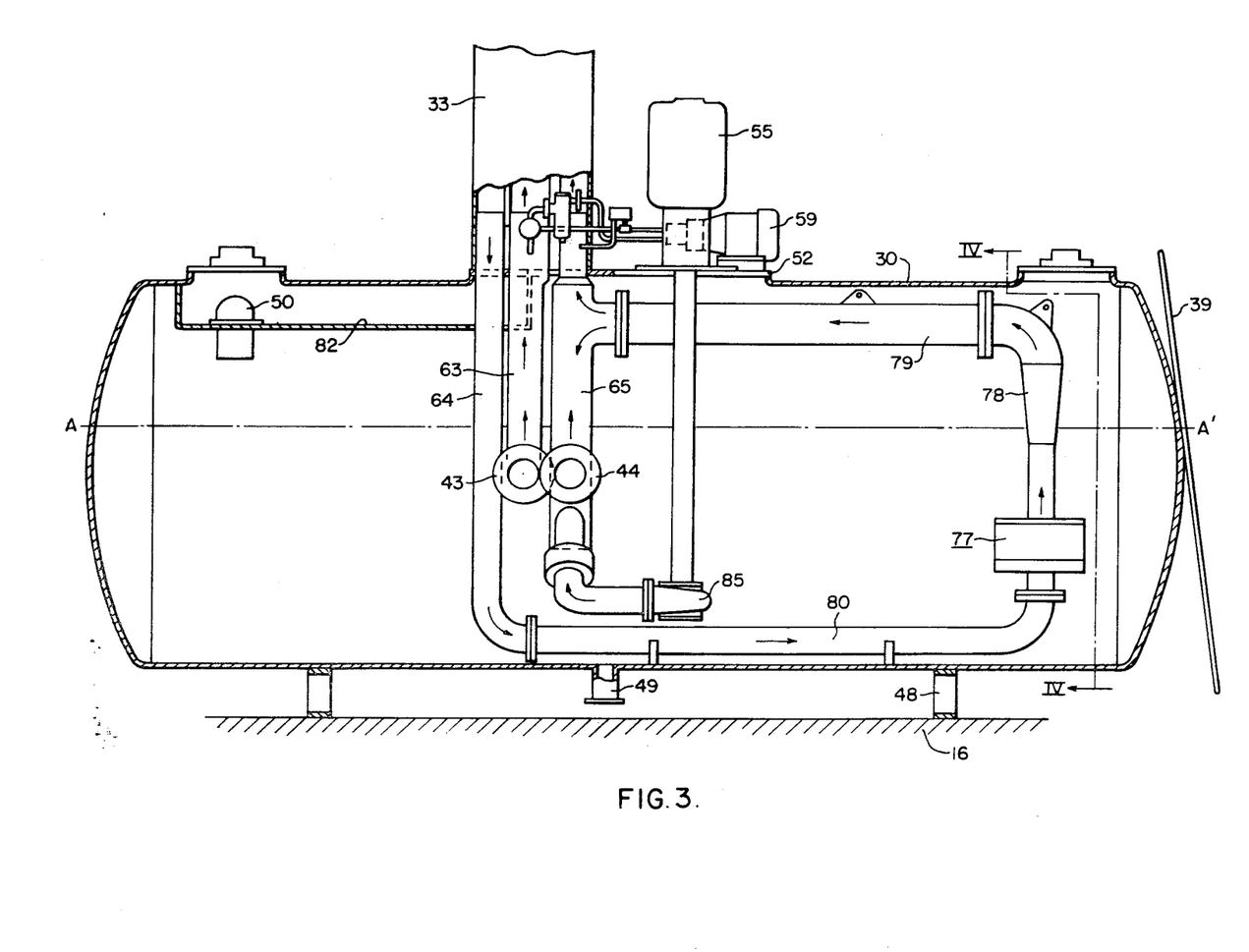
FIG. 3 is a sectional view of the reservoir taken along line III—III of FIG. 2 with certain internal parts in elevation.
Figure 4:
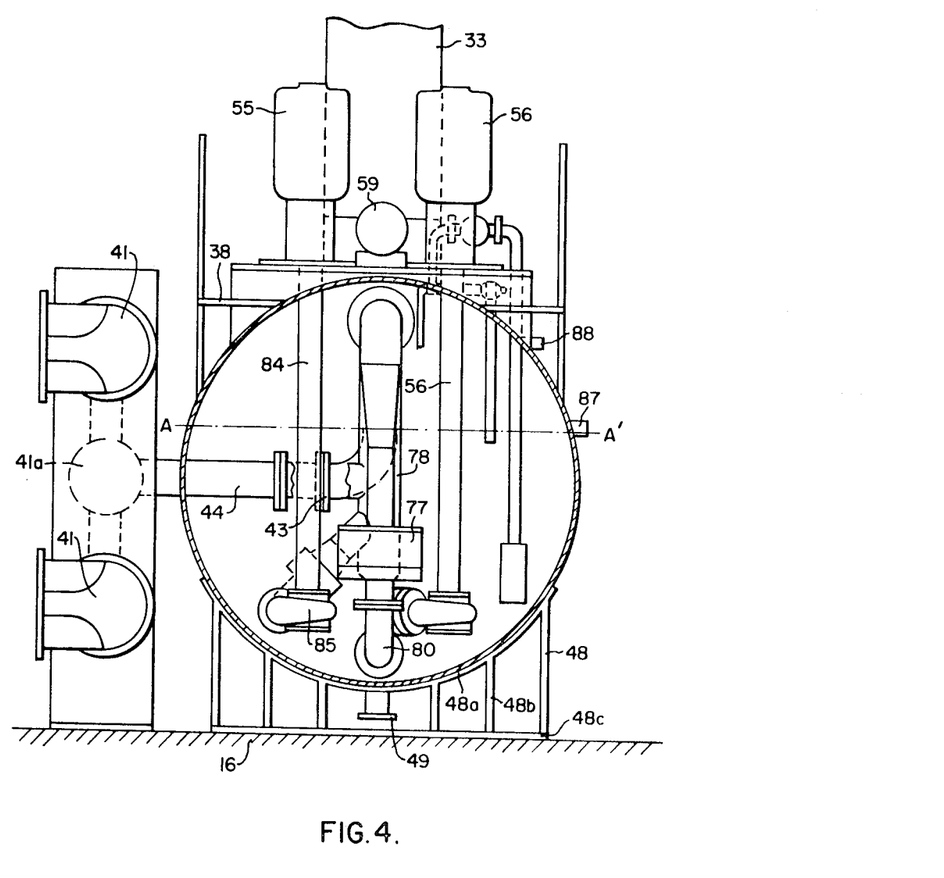
FIG. 4 is a cross-sectional view taken of the reservoir along line IV—IV in FIG. 3.

Two manhole covers 45 and 46 (FIG. 2) are provided adjacent opposite ends of the top 35 of the reservoir 30. These covers 45 and 46 may also be mounted in such a way as to serve as safety valves in case of high pressure buildup in the reservoir 30. Referring to FIGS. 3 and 4, it can be seen that the bottom of the reservoir 30 is supported on a pair of platforms 48 having a curved portion 48a, conforming to the curvature of the reservoir 30, vertical supports 48b and a base portion 48c. The base portion may be secured to the lower floor level 16 of the foundation (FIG. 1) by any suitable means. A drain spout 49, extending vertically downward, is located on the bottom of the reservoir 30.

A plate 52 is provided to cover opening 36, as best shown in FIG. 2. The plate 52 is circular in plan and it is approximately equal in size to the top opening 36 of the reservoir 30. The plate 52 has an inner surface 53 (FIG. 5) and an outer surface 54 (FIG. 5). Mounted on the outer surface 54 of the plate 52 are pumping means and various conduits which provide lubricant to the turbogenerator unit 11. Representative of the equipment mounted on the plate 52, shown in FIGS. 2 and 3, are an AC bearing oil motor 55, a DC backup emergency oil motor 56, a high-pressure seal oil pump 57, a high-pressure seal oil pump motor 58, a main bearing lift pump 59, the guard pipe 33, the bearing oil conduit 63, the main oil pump discharge conduit 64, a main oil pump suction conduit 65 and a high-pressure seal oil backup conduit 66. The conduits 63, 64, 65 and 66 are enclosed within the guard pipe 32. Also enclosed within the guard pipe 33, are vent opening 67 and two oil drain holes 68. The main purposes of the guard pipe 33 are to contain the lubricant if a leak occurs in the pressurized conduits 63, 64, 65 and 66 and to act as a gravity drain for the oil from the bearings to reservoir 30 through drain holes 68. The plate 52, the pumping equipment, and the conduits described are assembled and secured together to form a unitary plate structure 70. As best shown in FIGS. 2 and 5, a vapor extractor motor pump 71 is fastened to the top of the reservoir 30 adjacent the opening 36. An elbow flanged conduit 72 is secured to and extends through the plate 52 in a vertical direction. A vapor extractor discharge 74 is secured to both the pump 71 and flange 72 by a connection 75. The pump 71 and the vapor extractor discharge 74, alternatively, can be secured directly to the plate 52 to become a part of the unitary plate structure 70.

Referring to FIGS. 3 and 4, it can be seen that the reservoir 30 when filled with lubricant is up to dot-dash line A-A' indicating the normal operating level. There is an overflow conduit 87 (FIGS. 2 and 4) which goes to a filtering system (not shown) and a makeup conduit 88 from the filtering system to maintain constant maximum height.

When an AC bearing oil pump 85 (FIG. 3) driven by motor 55 pumps oil to the main oil pump conduit 65, a portion of this oil flows through conduit 44 into a three-way valve 41a (FIG. 4) to the coolers 41. The cooled oil returns from the coolers 41 through the valve 41a to conduit 43. The oil then flows through the bearing oil conduit 63 located in guard pipe 33 to the turbogenerator bearings 24 and 25. The other portion of the oil flows through conduit 65 contained in guard pipe portions 33a and 33b. The lubricant from the main oil pump (not shown), which is located on the first bearing pedestal 24 (FIG. 1), returns through the main oil pump discharge conduit 64, which is also contained in guard pipe portions 33a and 33b, and enters into a second horizontal conduit 80 in the reservoir 30. This oil is used to create a vacuum for an oil ejector 77. Oil is pumped from the ejector 77 located in the lower right hand end and in the center of the reservoir 30, through a vertically extending frustoconical conduit 78 and flows through a horizontal conduit 79. From conduit 79, the oil flows into the main oil pump suction conduit 65 and divides; one portion goes vertically upward to the main oil pump (not shown) and one portion goes vertically downward to the cooler conduits 44.

The oil from the turbogenerator bearings 24 and 25 (FIG. 1) drains into the guard pipe 32 as indicated by the broken arrows. The oil flows from the pipe 32 through drain holes 62 and 68 (FIG. 2) onto a trough 82 (FIG. 3). The oil then flows through strainer 50 on the left end of the reservoir 30. The oil is filtered by strainer 50 and is slowly drawn from the leftmost portion of the reservoir to the rightmost portion where it is picked up by ejector 77 thus allowing for maximum settling time.

Referring to FIG. 5, the unitary plate structure 70 is shown exploded relative to the reservoir 30. The ejector 77, the vertical conduit 78 and the two horizontal conduits 79 and 80 are shown first inserted into the reservoir 30. In some reservoirs where the open portion 36 is large enough, the ejector 77 and the conduits 78, 79 and 80 may be initially secured to conduits 64 and 65 to be a part of the unitary plate structure 70. The second horizontal conduit 80 is supported on the reservoir 30 by supports 87a; the first horizontal conduit 79 and the vertical conduit 78 may be supported by suitable means such as by hangers 88a.

The main oil pump discharge conduit 64, the bearing oil conduit 63, the main oil pump suction conduit 65, the vapor extraction conduit 72, and the pump 85 are all secured to the plate 52 projecting downward from the inner surface 53. The same conduits 64, 63, 65, and 72 project upward from the outer surface 54 of the plate 52 and except for the vapor extraction conduit are all enclosed in the guard pipe 32. The guard pipe 32, the AC bearing oil pump motor 55, the bearing lift pump 59 and other related piping and pumping means are all secured to the outer surface 54 of the plate 52. All the conduits and pumping equipment secured to the plate 52, comprise the unitary plate structure 70.

The unitary plate structure 70 is lowered into the reservoir 30 through the open portion 36. The plate 52 is supported on the shelf 37. There are a maximum of four internal conduit connections to make. These are the main oil pump discharge conduit 64 is secured by a flange connection to the second horizontal conduit 80. The main oil pump suction conduit 65 is secured by a flange connection to the first horizontal conduit 79. The bearing oil conduit 63 is connected to conduit 43 which is the return conduit from the cooler 41 and the main oil pump suction conduit 65 is secured to conduit 44 which is the conduit to the coolers 41. The unitary plate structure 70 is then detachably secured by suitable means to the shelf portion 37 of the reservoir 30. The vapor extractor suction conduit 72 is externally secured to the vapor extractor discharge 74 by an external flange connection 73.

As can be seen from the preceding, no welding or cutting is done inside of the reservoir 30. The time needed for a man to work inside of this very confining and limited area is minimized. Piping equipment need not be lifted out and then lifted back into the reservoir 30. Finally, the construction of the unitary plate structure 70 can be done without requiring the reservoir 30 to be at the manufacturing site, thus minimizing congestion around the shops. The end result is a savings in time and money, a healthier working environment, and a neater appearing reservoir structure.

DESCRIPTION OF THE SECOND EMBODIMENT

Figure 6:
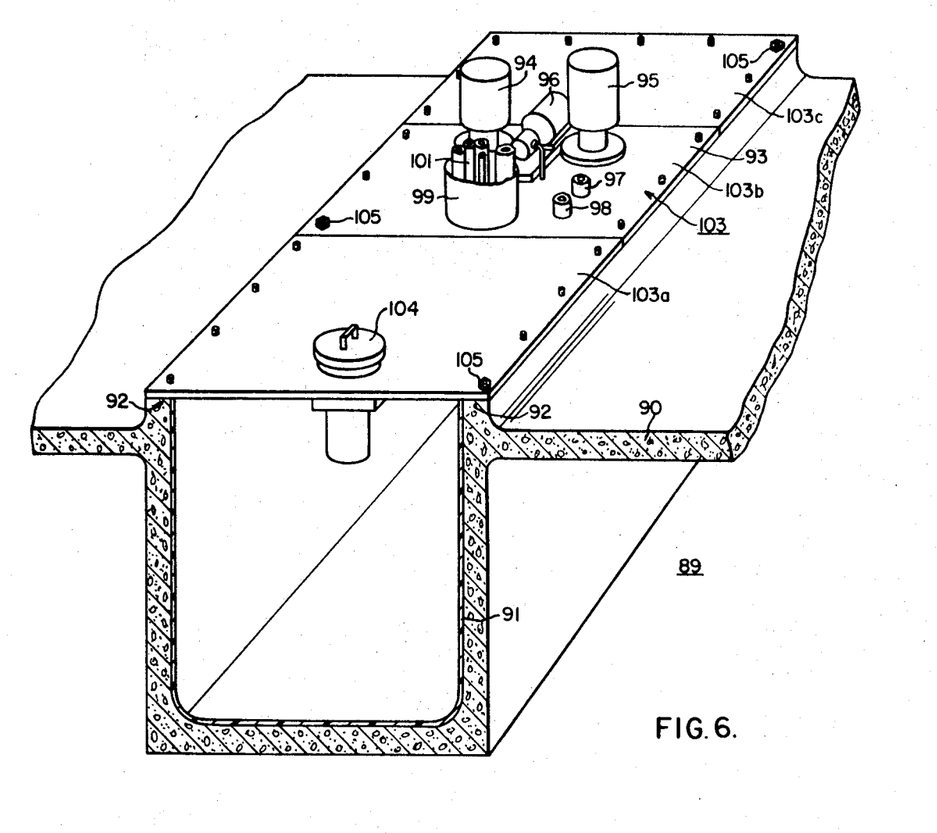
FIG. 6 is a cross section of a view in perspective showing another embodiment of the invention.

Referring to FIG. 6, it can be seen that a reservoir 89 is constructed in a foundation which may be a lower floor level 90 of a turbogenerator unit such as the lower floor level 16 for the turbogenerator unit 11 as shown in FIG. 1. The reservoir 89 is U-shaped in cross section, closed at both ends and may be made of reinforced concrete. Since concrete reservoirs are susceptible to attack by certain liquids, the inside portion of the reservoir 89 is lined with a material impervious to the lubricant. This liner 91 may be an epoxy type material which is sprayed on or may be a metallic material which may also be sprayed on or otherwise deposited on the inside of the reservoir 89. This liner 91 would generally conform to the contour of the inner surface and would depend on the inner surface for its shape and support. The reservoir 89 contains a shelf portion 92, one of the shelves being on each of the four sides of the reservoir.

A plate 93 is provided, to which is fastened the top bearing oil pump motors 94 and 95 which may be, as previously described, the AC bearing oil motor 55 and DC backup emergency oil pump motor 56. Also secured to the top of plate 93, as shown in FIG. 6, is a main bearing lift pump 96 and two conduits 97 and 98, one conduit 97 going to the cooler (not shown) and one conduit 98 coming from the cooler. A guard pipe and gravity drain 99 is secured to the plate 93.

As previously described, the guard pipe and gravity drain 99 encompasses the high-pressure lubricant conduits 101 which are also secured to the plate 93, but which project down into the reservoir 89. The conduits 101 may be similar to and perform the same function as the high-pressure conduits previously discussed and described in the preferred embodiment. The conduits and pumping equipment secured to the plate 93 comprise the unitary plate structure 103. The plate structure 103, as shown, has three sections 103A, 103B and 103C. On the first section 103A, a strainer 104 is shown secured thereto through which oil returning from the bearings (not shown) will flow. Alternatively the three sections 103A, 103B, 103C can be comprised of more than three sections or less than three sections. Because of the relatively large opening on top of the reservoir 89 shown in this second embodiment, the internal piping which is similar to that shown in FIG. 3, comprising first and second horizontal conduits 79 and 80 and vertical conduits 78 along with the ejector 77, can all be directly secured to the unitary plate structure 103 and can be a part of the unitary plate structure. The whole structure 103 can be constructed and assembled outside of the reservoir 89 and then lifted onto the shelf portion 92 of the reservoir 89. The internal piping (not shown) would be secured to its support structures inside of the reservoir 89. The unitary plate structure is detachably secured to the reservoir 89 at the shelf portions 92 by suitable fastening means 105. Finally, any external connections, such as the cooler connections 97 and 98 are completed.

What is shown then is a reservoir which eliminates the need for a separate foundation in addition to the foundation required for the turbogenerator unit. No additional surface space is needed for the reservoir and the plate structure can be constructed without the necessity for having a reservoir present at the job site. Finally, the necessity for a man to do any work inside of the reservoir is minimized.

What we claim is:

1. In a lubrication system for a machine having bearings rotatably supporting at least one journal,
said system comprising in combination a closed lubricant reservoir having an open top portion,
a plate structure,
said plate structure having an outer and inner surface,
conduit means external to said reservoir and pumping means external to said reservoir,
said conduit means including at least one pressurized lubricant conduit,
said external means being mounted on said outer surface of said plate structure,
said external conduit means including a guard pipe encompassing at least one pressurized lubricant conduit,
said guard pipe being adapted to contain said pressurized lubricant,
conduit means internal to reservoir and pumping means internal to said reservoir,
said internal means being attached to said inner surface of said plate structure,
said external means cooperating with corresponding internal means to supply lubricant to said bearings,
means to detachably secure said plate structure to the top of said reservoir thereby closing said open top portion, and
means to adjustably secure said conduit and pumping means to said reservoir.

2. The structure recited in claim 1 wherein the lubricant reservoir comprises a cylindrical body portion, two end portions, and an open top portion.

3. The system recited in claim 1 and further including means for draining the lubricant escaping from the bearings,
the guard pipe communicating with said drain means,
at least one drain opening in the plate structure,
and said guard pipe communicating with said drain opening to discharge lubricant therethrough.

4. In a lubrication system for a machine having bearings rotatably supporting at least one journal,
said system comprising a closed lubricant reservoir having an open top portion,
a plate structure,
said plate structure having an outer and inner surface,
conduit means external to said reservoir and pumping means external to said reservoir,
said external means being mounted on said outer surface of said plate structure,
conduit means internal to reservoir and pumping means internal to said reservoir,
said internal means being attached to said inner surface of said plate structure,
said external means cooperating with corresponding internal means to supply lubricant to said bearings,
means to detachably secure said plate structure to the top of said reservoir thereby closing said open top portion,
means to adjustably secure said conduit and pumping means to said reservoir,
said lubricant reservoir comprising a reinforced concrete channel,
said channel having an open top portion,
said channel lined with a material impervious to the lubricant, and said material dependent on said channel for its shape and support.

5. The structure recited in claim 4 wherein the channel has two end portions on the ends of the channel, said end portions lined with a material impervious to the lubricant, and said material dependent on the channel for its shape and support.

6. The structure recited in claim 5 wherein the channel is a parallelepiped.

* * * * *